United States Patent Office
3,408,255
Patented Oct. 29, 1968

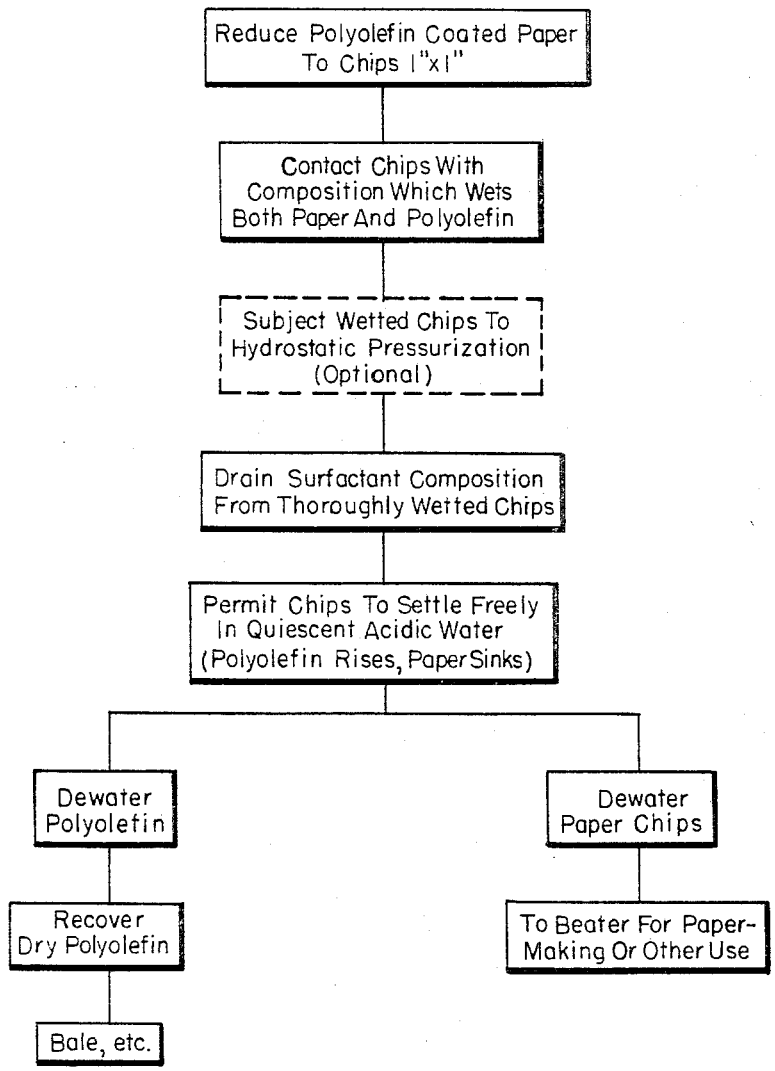

3,408,255
PROCESSING OF COATED PAPER
David Tatum, 325 Dartmouth Ave.,
Swarthmore, Pa. 19081
Filed Aug. 20, 1964, Ser. No. 390,826
6 Claims. (Cl. 162—5)

ABSTRACT OF THE DISCLOSURE

A process for obtaining a clean separation of resin or plastic coatings from the paper stock on which they are present, by contacting the coated paper with a liquid which intrudes between the paper and the resin and effects a clean separation of the two from one another.

---

This invention relates to a process for separating and separately recovering synthetic resin film coatings and paper stock from the trim and other waste products generated in the manufacture of thermoplastic resin coated containers such as are presently used for the marketing of milk to individual consumers. More particularly it relates to a process for obtaining a clean separation of the resin from the paper in an efficient and economical manner.

The invention will be described as it relates to the separation and separate recovery of polyethylene and paper stock from milk carton trim but it will be readily appreciated that the process is applicable to the processing of a variety of resin coated papers and is not to be construed as being limited to this specific raw material.

In reclaiming or salvage of the mill trim and waste generated during manufacture and printing of polyethylene coated paper milk cartons a troublesome problem is encountered in separating and removing the polyethylene from the waste paper stock. One presently attempted approach to the separation and recovery of the polyolefin and paper base is described in U.S. Patents 3,051,609 and 3,051,610 issued Aug. 28, 1962 to Grossmann and Myers. As stated in these patents, it is possible to recover some proportion of the paper fibers alone from the polyolefin without recovering the polyolefin by simply "beating" the stock in the form of chips in water and then mechanically screening out the polyolefin fraction of the chips and recovering the paper fibers hydrated in a pulp. In this case the polyolefin fraction of the chips carries a considerable amount of paper fibers strongly adhering. With high grade paper board it is possible that the proportion of recoverable paper stock may be great enough to make such recovery economical, but in the case of stock classified as paper, as distinguished from paper board, the recoverable proportion is so little as to make the recovery doubtful. However, in both cases the polyolefin fraction of the chips is useless because of the difficulty of removing the adhering paper fibers. Polyolefin can be recovered from paper by chemical and thermal methods, by which the polyolefin coated chips are immersed in a hot solvent to dissolve all the polyolefin from the paper chips and then the polyolefin is precipitated by cooling and centrifuging. This procedure is difficult, however, and not economical, because at about the critical temperature range of 85 to 90 degrees C. and above, which is desirable for solution, the polymer has a tendency to gel. When the solvent treatments described in the aforesaid patents are utilized, it becomes necessary, in order for the process to be economically feasible, to recover and reuse the solvents employed and such recovery is expensive and because of the complexity of the systems described may present technical difficulties.

When separation is attempted by merely "beating" the carton scrap, it is found that a very incomplete separation of the paper fibers from the polyethylene film is achieved, because a considerable amount of fiber adheres tenaciously to the polyethylene. When efforts are made to hot extrude the polyethylene, the paper fibers char and discolor and otherwise interfere with the reutilization of the polyethylene. Furthermore the polyethylene-paper mass forms knots and clumps in the beater and the resulting clumps, containing swollen pulp and water, are difficult and expensive to dry. In addition, the entrainment of small pieces of polyethylene with the paper pulp discharged from the beater seriously interferes with the utilization of such pulp on a Fourdrinier or other paper making apparatus.

The above discussion makes evident that a process which effects a clean and economical separation of the paper and the coating is urgently needed.

With the above in mind the principal object of the present invention is the separation of the polyolefin or other resinous coating from the paper base.

Another object of the invention is to remove and to recover all of the polyolefin coating material with no adhering or attached paper fibers.

Still another object of the invention is to provide a process in which the desired clean separation is rapidly and efficiently performed.

These and other objects are achieved by the process shown schematically in the single sheet of drawing in the nature of a flow sheet, illustrating a preferred embodiment of this invention, which process is more fully described below.

As shown in the flow sheet, the first step of the preferred procedure is to chip, clip or slice the paper stock, e.g. scrap or trim, as it is received into the process, into pieces approximately 1″ x 1″ with a minimum of disturbance of the material, such as would result from beating or attrition. The chips may be as small as ½″ x ½″ or somewhat larger than 1″ x 1″ without losing the benefits of the process, but I have found that chips between ¾″ x ¾″ and 1″ x 1″ represent an optimum size in the process.

Once the stock has been sliced into chips of the desired dimensions, the chips are soaked with a wash, bath or spray of a suitable composition which wets both the polyolefin and the paper fiber which is exposed along the sides of the chips, between the upper and lower polyolefin coatings, and which penetrates into the interface between the fiber layer and the coating layers. Compositions similar to presently known textile scours have been found to be effective in this step of the process, but the most effective compositions I have utilized comprise between 0.5% and 1.5% of a surfactant+water solution at room temperature (60° F. to 100° F.) containing an essential oil diluted with a hydrocarbon, both suspended in the aqueous surfactant solution, as an emulsion.

One suitable formulation was prepared by dissolving 10 parts by weight of an alkyl benzene sodium sulfonate (Ultrawet K) and 40 parts by weight of alkyl phenyl ethylene oxide condensate (Kyro EO) in 3800 parts by weight of water, at room temperature. A separate mixture consisting of 20 parts by weight of oil of orange, 30 parts by weight of toluene, 2 parts by weight of anhydrous methanol was warmed to 130° F. and 2 parts by weight of an emulsifier (Mulsoid 815M, Colloids Inc., Newark, N.J.) was added and the composition was then thoroughly mixed. While it was still warm, the resulting composition was poured into the water-surfactant mixture while the latter was stirred. As a result an emulsion formed. Other mixtures of nonionic and anionic surfactants may be substituted for the specific ones used above. The emulsion was applied to the chips by dumping the chips into the emulsion and stirring very gently. The emulsion appeared to seep in between the outer layers of polyethylene and to gradually crowd the air which is normally present in the paper layer into a spot near the center of each chip.

In order to assist in the intrusion of the surfactant into the interface between the paper and the coating, and to permit this to occur more rapidly, the chips may be subjected to hydrostatic pressurization while the surfactant composition is being applied to the chips. It has been found that the application of hydrostatic pressure of from 500 to 600 p.s.i. will cause the air entrapped within the paper between the two adhering polyolefin films to collapse and to permit more rapid intrusion of the surfactant to wet the polyolefin side and the paper fiber side of the bond interface. Oscillation or pulsing of the pressure during its application increases the rapidity of the penetration and the collapse of the entrapped air. The substitution of a water soluble gas such as carbon dioxide instead of air also increases the penetration rate of the intruding surfactant liquid solution or emulsion. A low cost hydrostatic pressurizing vessel which may be used consists of a U-tube configuration extended into the earth to a depth of 1000 to 2000 feet. In practicing this step the chips suspended in the surfactant fluid are caused to circulate from the top of one leg downwards into the U-tube to the high pressure region at the bottom and then to return to the top of the other leg of the U-tube.

The U-tube may consist of two pipes, an inner pipe concentric with an outer pipe, which outer pipe is the well casing, the inner pipe having an inside cross sectional area equal to the annular space between the two pipes.

The positioning and operation of a sonic means at the bottom of the U-tube will by vibration waves accelerate the delamination forces of wetting, detergency and penetration of the surfactant/water medium.

After the chips have been thoroughly wetted, the chips are separated from as much of the surface-active composition as possible. This is accomplished by discharging the chips onto a sloping, vibrating screen. The liquid which drains from the chips is recovered and used for treating additional batches of chips. The chips, as they fall off the exit end of the screen are received in a quiescent tank of water made slightly acid by the addition of a small amount of acetic acid. As the chips settle freely in the quiescent water bath, it has been found that the wetted layers of polyolefin will slip away from the paper layer and will rise to the surface of the acidified water while the paper stock and paper fiber will settle at the bottom of the pool. It has been further noted that although substantial amounts of turbulence will interfere with this separation and will cause the polyolefin chips and paper stock to become intermingled, the desired separation is facilitated by the use of a low energy mixing device at the entrance end of the tank in which free settling and separation are effected. Preferably this mixing means is located about midway between the top and bottom of the sink-float separator.

A well having a depth of between 1000 and 2000 feet and a diameter of at least 24 inches is a preferred apparatus for carrying out the sink-float separation step. An amount of water is added to the chips discharged from the screen, or from the hydropressurization step if such step is used, the amount being sufficient to produce a dilute slurry. The slurry is conveyed by suitable pipe or conduit means to a point half-way down the well where the slurry may be discharged under turbulent and mixing conditions into water contained in the well. Since free settling sedimentation conditions prevail in the water that fills the well there will be no entrapment of paper pulp in the rising movement of polyolefin nor entrapment of polyolefin in the sinking paper pulp and chips, and the paper chips and pulp settle to the bottom of the well and the polyolefin rises to the top of the well. At the bottom, and at the top, of the well water is withdrawn at equal flow rates. The water being withdrawn from the bottom of the well contains entrained paper chip and paper pulp and is sent to a paper making machine.

The overflow of water at the top of the well is discharged through the walls of a vertical cylindrical screen means to dewater the polyolefin material as it is discharged upwardly out of the well. The buoyant forces on the polyolefin residue causes lifting of a portion of the polyolefin material up above the water surface where this lifted portion drains itself of water as it is forced upwards through the bore of the vertical cylindrical screen means. Means are provided to dry the polyolefin discharge as it emerges from the top opening of the bore of the vertical cylindrical screen means. A vortex of dry warm air may be used to lift the polyolefin material and entrain the material in a warm stream of air to dry it by means familiar to those skilled in the art of air drying, particularly, as an example, the art of air drying of feathers.

The final operation of the process insofar as the polyolefin portion is concerned, is a baler, or packaging or conveyor means to receive the dried polyolefin product of the process.

The final operation of the process, insofar as the paper chip and paper pulp portion is concerned, is a dewatering means to prepare a feed flow having a more suitable concentration of paper chips suspended in water for a beater means usual in the art of papermaking.

Instead of the anionic/nonionic alkyl benzene sulfonate/alkyl phenol ethylene oxide condensate-water mixture described above, the emulsion may be prepared using twenty parts by weight of sulfonated castor oil (Turkey red oil) and twenty parts by weight of a commercial scour, such as ethoxylated alkyl phenol (Allo Scour B) plus ten parts by weight of another nonionic amino condensate (Penetrator WH9) to 3800 parts of water.

Other essential oils may be used in place of the oil of orange and other polyolefin solvents may be used in place of toluene. The same is true of both the methanol and emulsifier for which other alcohols and proprietary preparations may be substituted.

Since many immaterial changes will occur to others skilled in the art, given the above disclosure, it is not intended that it be limited except as may be required by the appended claims.

I claim:
1. A process for treating paper stock coated with a thermoplastic resin in order to separate and separately recover the paper and the coating material which process comprises:
 (1) reducing the coated stock to chips approximately 1″ x 1″ in size;
 (2) soaking said chips with a composition which wets both the paper and the coating material whereby said composition intrudes into the interface between said paper and said coating, said composition comprising between 0.5% and 1.5% of a surfactant plus water solution at room temperature containing an essential oil diluted with a hydrocarbon both suspended in the aqueous surfactant solution, as an emulsion;
 (3) draining said soaked chips;
 (4) charging said soaked chips into a quiescent body of water whereby the wetted coating becomes detached from the paper and is conveyed upwardly by buoyancy and the paper is conveyed downwardly by gravity; and
 (5) separately recovering said coating and said paper as a result of said sink-float separation.

2. The process of claim 1 wherein the coating is polyethylene and comprises about 10% by weight of the coated paper stock.

3. The process of claim 1 wherein the composition which wets the chips includes an anionic and a nonionic surfactant and an essential oil emulsified therein.

4. The process of claim 1 wherein the soaked chips are subjected to hydrostatic pressurization before draining said composition from said chips.

5. The process of claim 3 wherein the anionic surfactant is an alkyl benzene sulfonate and the nonionic surfactant is an alkyl phenol ethylene oxide condensate.

6. The process of claim 3 wherein the anionic surfactant is a sulfonated oil and the nonionic surfactant is an alkyl phenol ethylene oxide condensate.

References Cited
UNITED STATES PATENTS

| | | | |
|---|---|---|---|
| 1,953,150 | 4/1934 | Bull | 162—5 |
| 3,051,610 | 8/1962 | Grossmann et al. | 162—5 |
| 3,056,713 | 10/1962 | Gartner | 162—5 |
| 3,284,282 | 11/1966 | Immel | 162—55 |

HOWARD R. CAINE, *Primary Examiner.*